United States Patent
Kim et al.

(10) Patent No.: US 11,800,183 B2
(45) Date of Patent: Oct. 24, 2023

(54) VIDEO DATA TRANSMISSION/RECEPTION METHOD AND APPARATUS THEREFOR

(71) Applicant: LG ELECTRONICS INC., Seoul (KR)

(72) Inventors: Dokyun Kim, Seoul (KR); Seunghyun Yoo, Seoul (KR); Yoonjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/456,359

(22) Filed: Nov. 23, 2021

(65) Prior Publication Data

US 2022/0286727 A1    Sep. 8, 2022

(30) Foreign Application Priority Data

Sep. 25, 2020  (KR) .......................... 1020200125050

(51) Int. Cl.
*H04N 21/436*  (2011.01)
*H04N 21/435*  (2011.01)

(52) U.S. Cl.
CPC ......... *H04N 21/436* (2013.01); *H04N 21/435* (2013.01)

(58) Field of Classification Search
CPC .............. H04L 25/08; H04L 25/03006; H04N 21/4363; H04N 21/43615; H04N 21/436; H04N 21/435

USPC .................................................. 725/127, 149
See application file for complete search history.

(56) References Cited

U.S. PATENT DOCUMENTS

| | | | |
|---|---|---|---|
| 2013/0042291 A1* | 2/2013 | Kambhatla | H04N 21/4363 725/127 |
| 2017/0132749 A1* | 5/2017 | Lim | G06T 1/20 |
| 2019/0042507 A1* | 2/2019 | Venkatesan | H04L 25/08 |

* cited by examiner

*Primary Examiner* — Yassin Alata
(74) *Attorney, Agent, or Firm* — LEE HONG DEGERMAN KANG WAIMEY

(57) ABSTRACT

The present disclosure provides a method for a source device to establish a connection with a sink device, and an apparatus related thereto.

According to the present disclosure, a method for a source device to establish a connection with a sink device comprising: receiving, from the sink device, first capability information of the sink device related to a specific operation; transmitting, to the sink device, support version information on a version of capability information of the sink device readable by the source device; and receiving, from the sink device, second capability information of the sink device related to the specific operation based on the support version information, wherein a version of the second capability information is configured based on the support version information.

9 Claims, 13 Drawing Sheets

[FIG. 1]
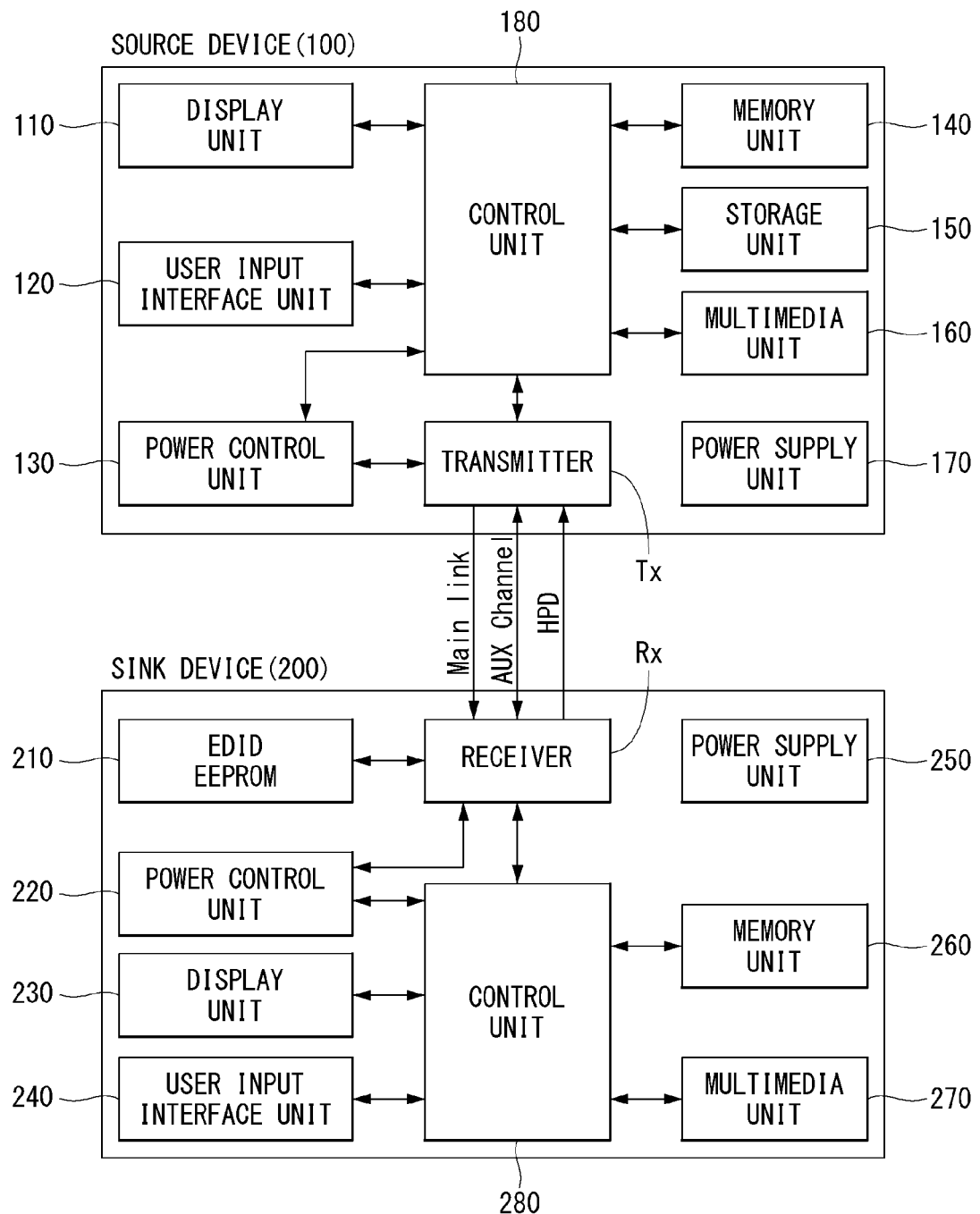

[FIG. 2]

| Definition | Formats | Field Rate | Aspect Ratio | WHETHER TO SUPPORT BASED ON STANDARD TECHNIQUES DisplayPort | |
|---|---|---|---|---|---|
| | | | | 1.2a | 1.3 |
| SD (Standard Definition) | | SUPPORT ALL | | | |
| ED (Enhanced Definition) | | SUPPORT ALL | | | |
| HD (High Definition) | | SUPPORT ALL | | | |
| Full HD | | SUPPORT ALL | | | |
| 4K UHD (Ultra High Definition) | 3840x2160p | 23.98/24Hz | 16:9 | SUPPORTED | SUPPORTED |
| | 3840x2160p | 25Hz | | | |
| | 3840x2160p | 29.97/30Hz | | | |
| | 3840x2160p | 50Hz | | | |
| | 3840x2160p | 59.94/60Hz | | | |
| | 3840x2160p | 23.98/24Hz | 64:27 | | |
| | 3840x2160p | 25Hz | | | |
| | 3840x2160p | 29.97/30Hz | | | |
| | 3840x2160p | 50Hz | | | |
| | 3840x2160p | 59.94/60Hz | | | |
| | 4096x2160p | 23.98/24Hz | 256:135 | | |
| | 4096x2160p | 25Hz | | | |
| | 4096x2160p | 29.97/30Hz | | | |
| | 4096x2160p | 50Hz | | | |
| | 4096x2160p | 59.94/60Hz | | | |
| 8K UHD | 7680x4320p | 23.98/24Hz | 16:9 | NOT SUPPORTED | NOT SUPPORTED (WILL BE SUPPORTED IN .3A) |

[FIG. 3]

| Address | No. Bytes | Description |
|---|---|---|
| 00h ~ 07h | 8 | Header information.<br>Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings.<br>Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[FIG. 4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

[FIG. 5]

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[FIG. 6]
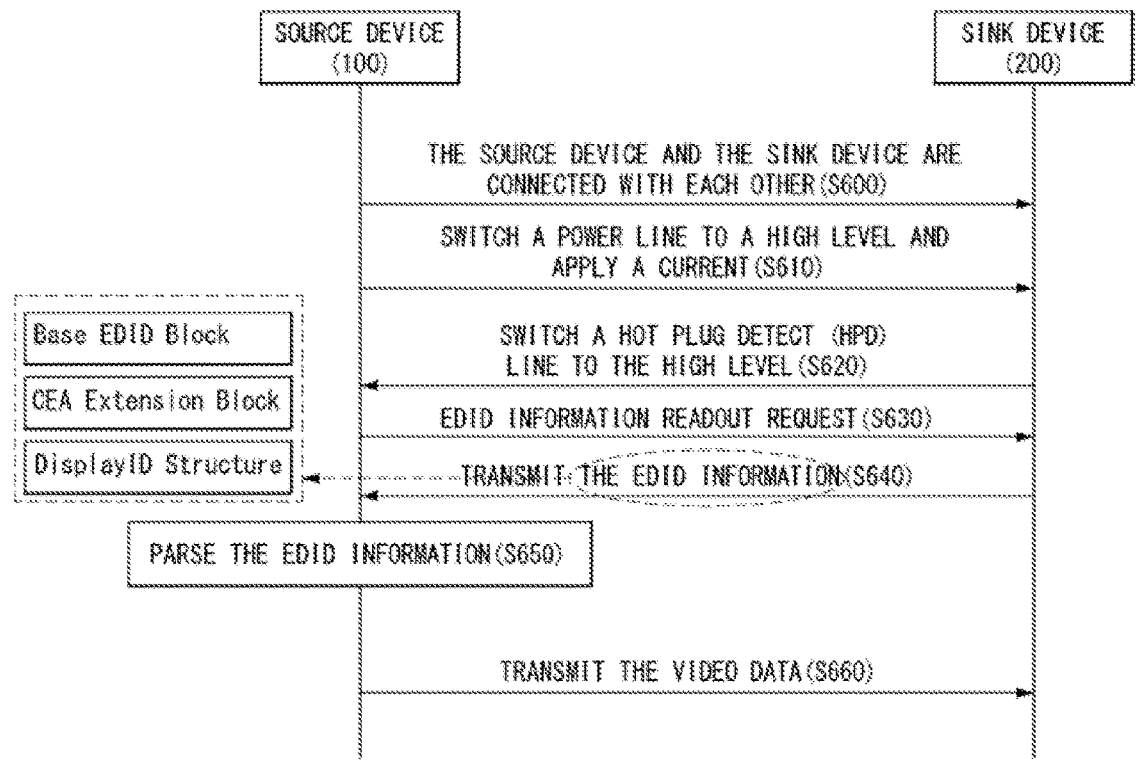
[FIG. 7]

[FIG. 8]
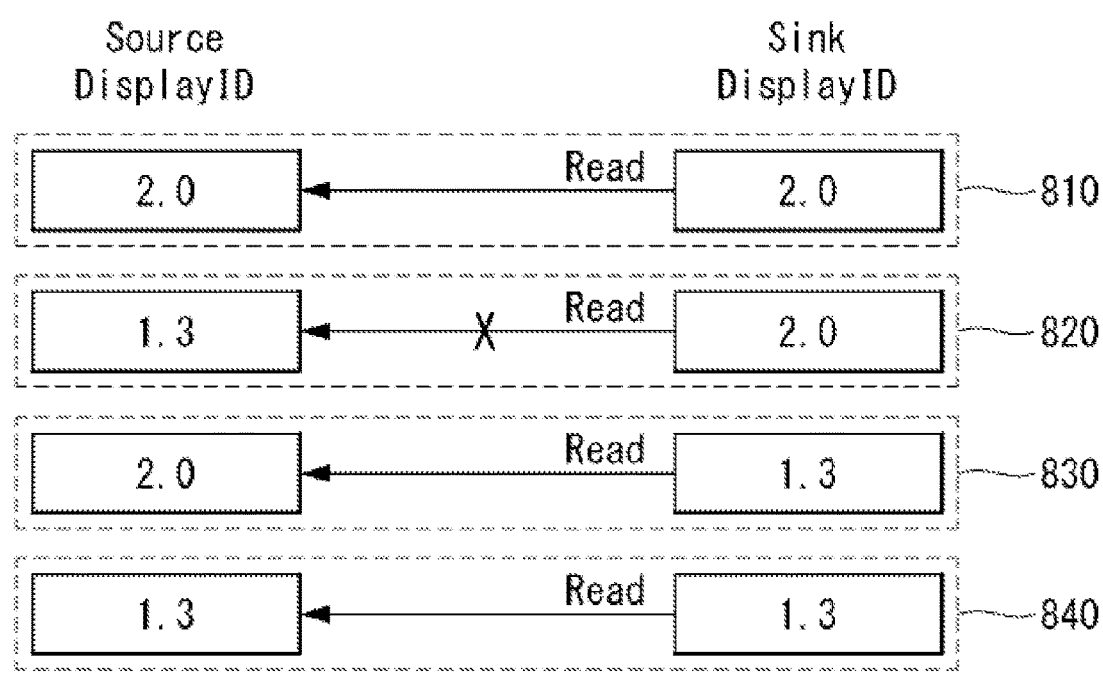

[FIG. 9]
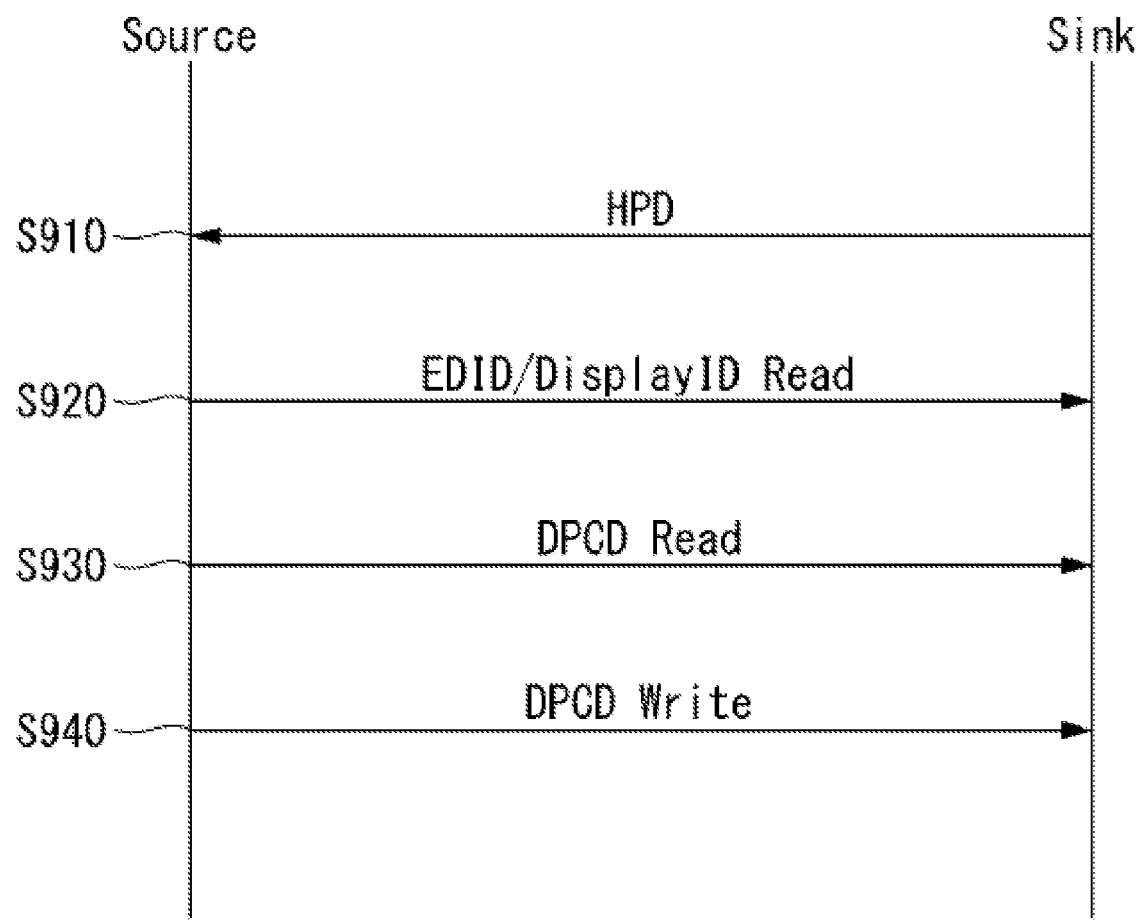

[FIG. 10]

| 00xxxh (ex : 001c4h) | | DISPLAYID_VERSION_INFO<br>Updated in DPv2.0<br>Shall be cleared to 00h when a power-on reset of upstream device disconnect occurs. | Write / Read |
|---|---|---|---|
| | 0 | DISPLAYID_UPPER_VERSION_SUPPORT<br>0: This source could not support DisplayID2.x<br>1 : This source could support DisplayID2.0 or higher. | |
| | 7:1 | RESERVED | |

[FIG. 11]

| Packet Type Value | Packet Type | Transmission Timing | See |
|---|---|---|---|
| 03h | DisplayID information | During Main Video stream HBlank/VBlank period | |

| Byte # | Bit # | Content |
|---|---|---|
| HB0 | 0 | DISPLAYID_VERSION<br>0:This source could not support DisplayID2.x<br>1:This source could support DisplayID2.0 or higher. |
| | 7:1 | Reserved |

[FIG. 12]
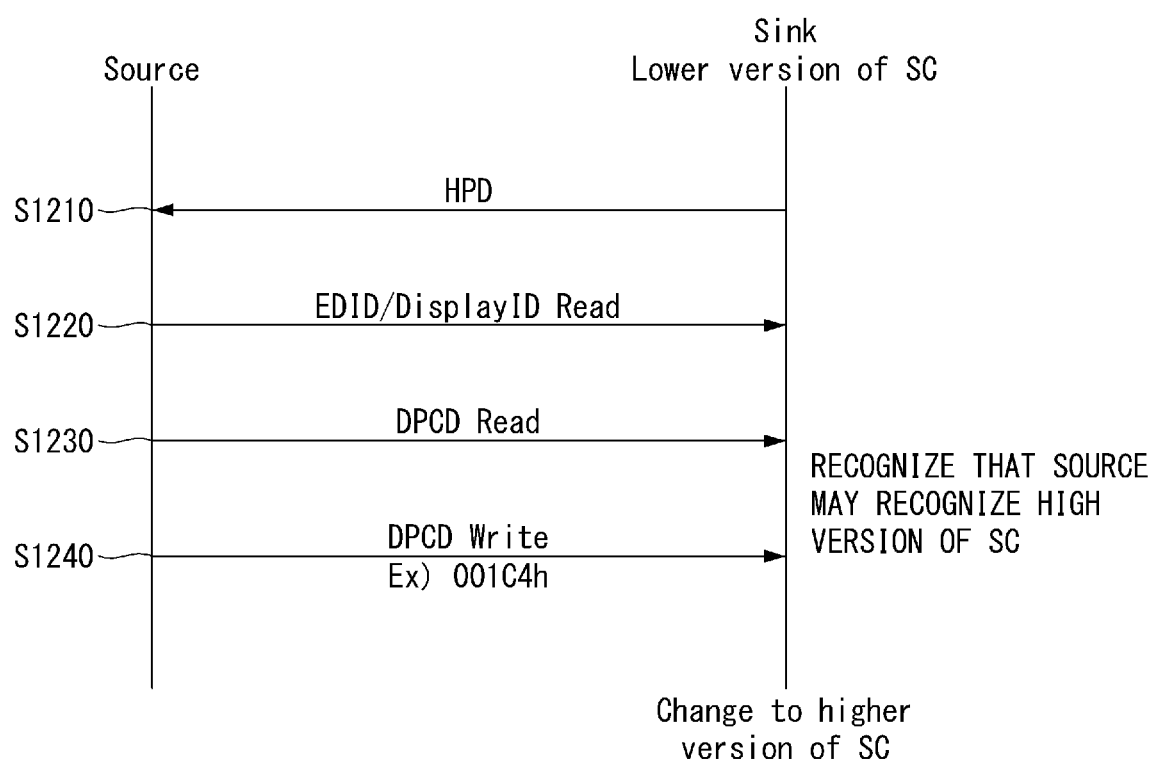

[FIG. 13]
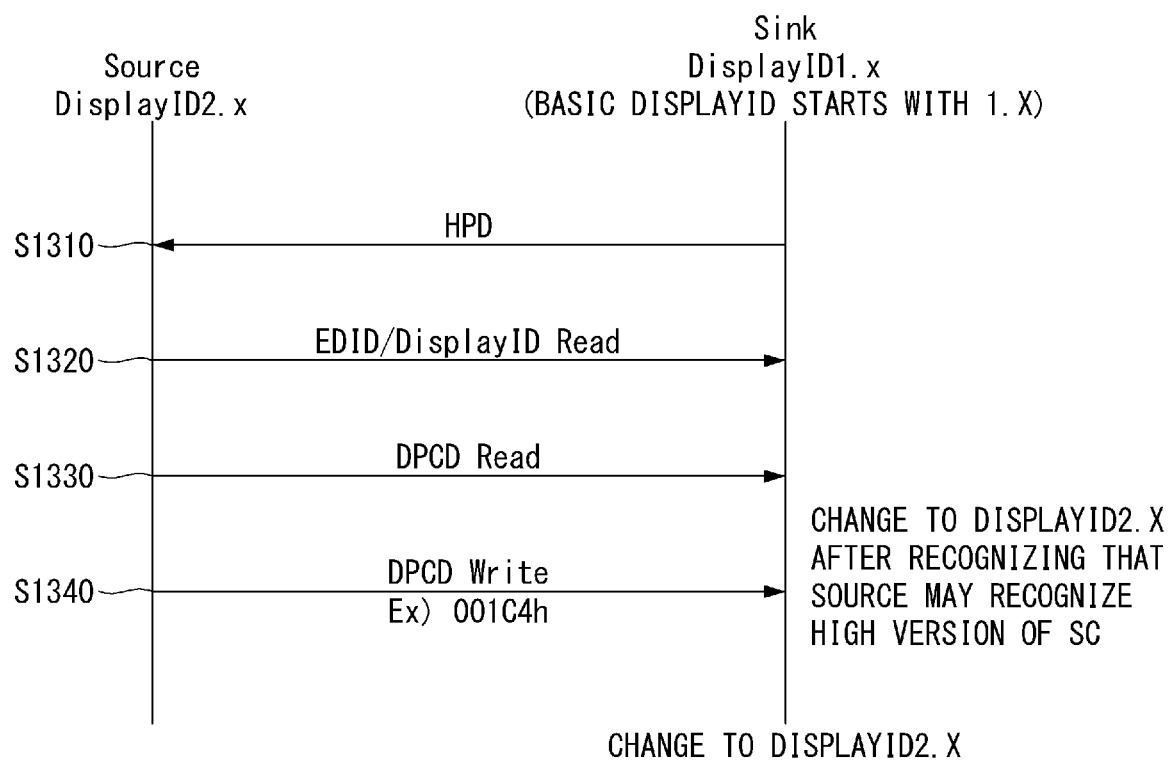

[FIG. 14]
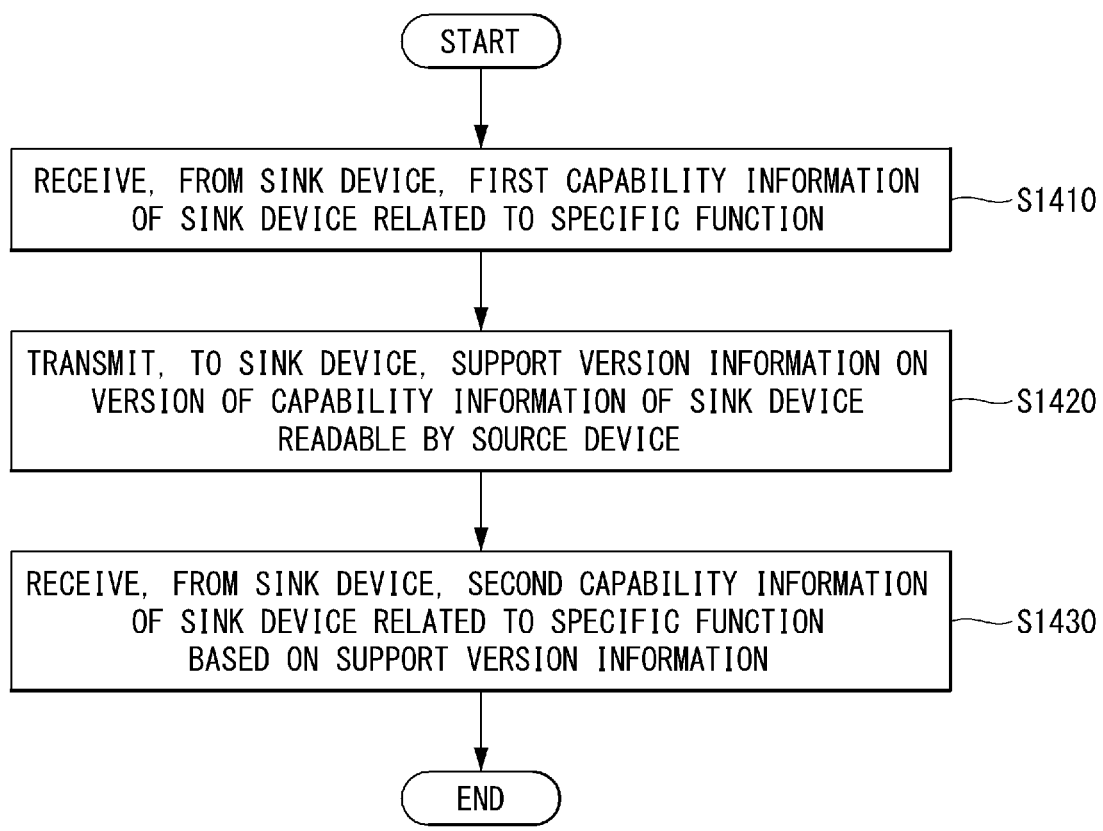

VIDEO DATA TRANSMISSION/RECEPTION METHOD AND APPARATUS THEREFOR

CROSS-REFERENCE TO RELATED APPLICATIONS

Pursuant to 35 U.S.C. § 119(a), this application claims the benefit of earlier filing date and right of priority to Korean Patent Application No. 10-2020-0125050, filed on Sep. 25, 2020, the contents of which are hereby incorporated by reference herein in its entirety.

BACKGROUND OF THE DISCLOSURE

Field of the Disclosure

The present disclosure relates to a data transmission/reception method using a display interface and an apparatus therefor and, more particularly, to a method for solving a compatibility issue between a source device and a sink device using a display interface and an apparatus therefor.

Related Art

A display interface means the interface for transmitting an image to a display apparatus such as a monitor or a TV. Representatively, there are the Digital Visual Interface (DVI), the High Definition Multimedia Interface (HDMI), the DisplayPort, and so on as the display interface.

Particularly, the DisplayPort is the display interface standard that is established by VESA. The DisplayPort forwards a digital image signal, and also outputs a digital sound with a single cable. The DisplayPort may output the digital sound as well as the image with a single cable, and characterized by the small cable size.

The DisplayPort defines the unidirectional Main Link for transmitting audio/video data stream and the half-duplex bidirectional auxiliary channel (AUX CH) for the plug-and-play operation.

SUMMARY

The present disclosure provides a method for a source device to establish a connection with a sink device and an apparatus therefor.

The present disclosure also provides a method for a source device to establish a connection with a sink device without a compatibility issue and an apparatus therefor.

Technical objects to be achieved by the present disclosure are not limited to the above-mentioned objects, and other technical objects which are not mentioned will be clearly understood by those skilled in the art to which the present disclosure pertains, from the following description.

The present disclosure provides a method for a source device to establish a connection with a sink device, and an apparatus related thereto.

Specifically, in the present disclosure, a method for a source device to establish a connection with a sink device, the method comprising: receiving, from the sink device, first capability information of the sink device related to a specific operation; transmitting, to the sink device, support version information on a version of capability information of the sink device readable by the source device; and receiving, from the sink device, second capability information of the sink device related to the specific operation based on the support version information, wherein a version of the second capability information is configured based on the support version information.

Furthermore, in the present disclosure, wherein the first capability information is configured to be transmitted using a specific version regardless of the version of the capability information supportable by the sink device.

Furthermore, in the present disclosure, wherein the support version information is information on whether the source device can read the capability information of the sink device of a higher version than the specific version of the first capability information.

Furthermore, in the present disclosure, wherein based on the support version information indicating that the source device can read the capability information of the sink device of a higher version than the specific version of the first capability information, the version of the second capability information is set to a higher version than the specific version of the first capability information based on the support version information.

Furthermore, in the present disclosure, wherein based on the support version information indicating that the source device can read the capability information of the sink device of a higher version than the specific version of the first capability information, the support version information further includes sub-version information on a sub-version of the version of the capability information of the sink device that the source device can read.

Furthermore, in the present disclosure, wherein the version of the capability information of the sink device is defined in a form of x.y, wherein the x and the y are non-negative integers, wherein as values of the x and the y are larger, the capability information of the sink device is a higher version capability information, and wherein the y indicates the sub-version of the version of the capability information of the sink device.

Furthermore, in the present disclosure, wherein the value of the x of the specific version of the first capability information is 1, and wherein the value of x of the version of the second capability information set to a higher version than the specific version of the first capability information is 2.

Furthermore, in the present disclosure, wherein based on the support version information indicating that the source device cannot read the capability information of the sink device of a version higher than the specific version of the first capability information, the second capability information is not transmitted from the sink device to the source device.

Furthermore, in the present disclosure, wherein the support version information is included in DPCD (DisplayPort Configuration Data) and transmitted.

Furthermore, in the present disclosure, wherein the support version information is included in SDP(Second Data Packet)and transmitted.

Furthermore, in the present disclosure, a source device to establish a connection with a sink device, the source device comprising: a transmitter for transmitting and receiving data; a control unit for controlling the transmitter; and at least one computer memory operably connectable to the control unit and storing instructions for performing operations when executed by the enemy control unit, wherein the operations include: receiving, from the sink device, first capability information of the sink device related to a specific operation; transmitting, to the sink device, support version information on a version of capability information of the sink device readable by the source device; and receiving, from the sink device, second capability information of the sink device related to the specific operation based on the support version information, wherein a version of the second capability information is configured based on the support version information.

The present disclosure is advantageous in that a source device can establish a connection with a sink device.

Further, the present disclosure is advantageous in that a source device can establish a connection with a sink device without a compatibility issue.

Effects to be obtained from the present disclosure are not limited to the above-mentioned effects, and other effects which are not mentioned will be clearly understood by those skilled in the art to which the present disclosure pertains, from the following description.

BRIEF DESCRIPTION OF THE DRAWINGS

The accompanying drawings, which are included herein as a part of the description for help understanding the present invention, provide embodiments of the present invention, and describe the technical features of the present invention with the description below.

FIG. 1 is a block diagram illustrating a DisplayPort system according to an embodiment of the present invention.

FIG. 2 is a table illustrating the resolution supported in the DisplayPort system.

FIG. 3 is a diagram illustrating an EDID structure according to an embodiment of the present invention.

FIGS. 4 and 5 are EDID Extension blocks according to an embodiment of the present invention.

FIG. 6 shows the Display Identification Data (DisplayID) according to an embodiment of the present invention.

FIG. 7 is a flowchart illustrating a method for transmitting and receiving data of a DisplayPort system.

FIG. 8 is a diagram illustrating examples of problem situations to which a method proposed in the present disclosure may be applied.

FIG. 9 is a flowchart illustrating an example of an operation between a sink device and a source device to which the method proposed in the present disclosure may be applied.

FIGS. 10 and 11 are diagrams illustrating an example of a method where the source device transmits support version information to the sink device.

FIG. 12 is a flowchart illustrating an example where the method proposed in the present disclosure is performed.

FIG. 13 is a flowchart illustrating another example where the method proposed in the present disclosure is performed.

FIG. 14 is a flowchart illustrating an example where the method for the source device to establish a connection with the sink device is performed.

DESCRIPTION OF EXEMPLARY EMBODIMENTS

Although the terms used in the present specification are selected as general terms which are currently used widely as possible while considering functions in the present specification, the terms may be changed according to intentions of those skilled in the art, practices and advents of new techniques. In addition, in a special case, a term is discretionally selected by the applicant. In this case, the meaning of the term will be described in the corresponding embodiment of the detailed description. Accordingly, the terms used in the present specification should be interpreted based on the substantive meanings of the terms and based on the description throughout the present specification, not based on simple nominal terms.

Further, the embodiments will be described in detail by reference to the accompanying drawings and the contents shown in the accompanying drawings, but the present invention is not restricted or limited to the embodiments.

Hereinafter, the preferred embodiment of the present invention will be described in more detail by reference to the accompanying drawings.

FIG. 1 is a block diagram illustrating a DisplayPort system according to an embodiment of the present invention. Hereinafter, the devices that transmit and receive video/audio/control data using the DisplayPort will be collectively referred to the DisplayPort system.

Referring to FIG. 1, the DisplayPort system may include a source device 100 and a sink device 200. Particularly, in the DisplayPort system, a device that transmits video/audio data through the DisplayPort may correspond to the source device 100, and a device that receives video/audio data through the DisplayPort may correspond to the sink device 200. In this case, as physical devices for supporting data transmission and reception by connecting two devices, DisplayPort cables and connectors may be provided.

The DisplayPort cables and the connectors may perform pairing between a Main link and an Auxiliary (AUX) Channel. The Main link and the AUX channel may be used for transmitting video data, audio data and auxiliary data.

The Main link is the channel of unidirectional, high-bandwidth and low-latency. The Main link may be used proper to the transmission of isochronous data streams.

The AUX channel is the channel of half-duplex and bidirectional. The AUX channel may be used for controlling the connection between devices and controlling the device. In order to perform the communication through the AUX channel, a source device 100 may be a master device that activates or initiates the AUX channel, and a sink device 200 may be slave device that responds to the activated AUX channel.

The source device 100 may receive the Extended Display Identification Data (EDID) information from the sink device 200. The source device 100 may detect configuration information, support function, and the like of the sink device 200 by parsing the received EDID information. The EDID information may include at least one block that includes various information on the sink device 200, which will be described below in detail in relation to FIG. 7.

The source device 100 may include at least one of a display unit 110, a user input interface unit 120, a control unit 180, a transmitter Tx, a memory unit 140, a storage unit 150, a multimedia unit, a power control unit 130 and a power supply unit 170.

The sink device 200 may include at least one of an EDID EEPROM 210, a power control unit 220, a display unit 230, a user input interface unit 240, a receiver Rx, a control unit 280, a power supply unit 250, a memory unit 260 and a multimedia unit 270. Hereinafter, description for units that perform the same operation will not be repeated.

The source device 100 represents a physical device for transmitting contents stored in the storage unit 150 to the sink device 200 or streaming the contents. The source device 100 may send a request message to the sink device 200 or receive a request message received from the sink device 200. The source device 100 may provide a UI for processing a response message that the sink device 200 transmits and delivering to a user, and this UI may be provided as a display in case that the source device 100 includes the display unit 110. In addition, the source device 100 may request a power to be supplied to the sink device 200.

The sink device 200 may receive contents from the source device 100, and may transmit a response message by transmitting a request message to the source device 100 or processing the message received from the source device 100. The sink device 200 may also process a response message received from the source device 100, and provide a User Interface (UI) which is delivered to a user. In case that the sink device 200 includes a display unit, the sink device 200 may provide the UI to a display.

The user input interface unit 120 or 240 may receive an action or an input of a user. As an embodiment, the user input interface unit 120 or 240 may correspond to a remote controller, a voice receiving/detecting device, a touch input sensing/receiving device, and so on.

The control unit 180 or 280 may control general operations of each device. Particularly, the control unit 180 or 280 may perform a communication between the units included in the respective devices, and may control the operation of each of the devices.

The memory unit 140 or 260 refers to as volatile physical devices that may store various types of data.

The storage unit 150 refers to as nonvolatile physical devices that may store various types of data.

The EDID EEPROM 210 refers to an EEPROM that stores EDID information.

All of the memory unit 140 or 260, the storage unit 150 and the EDID EEPROM 210 may play the role of storing data, and all of these may be collectively called the memory unit.

The display unit 110 or 230 may display data or contents received through the DisplayPort, data and UI stored in the memory unit, and the like by control of the control unit 180 or 280.

The multimedia unit 160 or 270 may play various sorts of multimedia. The multimedia unit 160 or 270 may be implemented separately with the control unit 180 or 280, or implemented as an integral physical component with the control unit 180 or 280.

The power supply unit 170 or 250 may supply power required to operate the source device 100, the sink device 200 and units included in these.

The transmitter Tx is a unit for transmitting and receiving data through the DisplayPort by being included in the source device 100, an may perform transmission and reception of data that includes commands, requests, actions, responses between devices as well as audio/video data.

The receiver Rx is a unit for transmitting and receiving data through the DisplayPort by being included in the sink device 200, an may perform transmission and reception of data that includes commands, requests, actions, responses between devices as well as audio/video data.

The power control unit 130 or 220 may manage and control power transmission and reception between devices through the transmitter and the receiver.

The units except the transmitter Tx, the receiver Rx and the control unit 180 or 280 among the units described above may be included in the source device 100 or the sink device 200, selectively according to an embodiment, and may not correspond to essential component units.

Meanwhile, although it is not shown in the drawing, the description of each of the blocks described above may be similarly applied to the HDMI system. Here, the HDMI system is collectively referred to the devices that transmit and receive video/audio/control data using the HDMI. The HDMI system may include the source device 100, the sink device 200 and an HDMI cable.

In the HDMI system, the device that transmits video/audio data through the HDMI may correspond to the source device 100, and the device that receives video/audio data through the HDMI may correspond to the sink device 200. And, the HDMI cables may be provided for supporting data transmission and reception by connecting two devices.

The HDMI cables and the connectors may perform pairing of four channels that provides a Transition Minimized Differential Signaling (TMDS) data channel and a TMDS clock channel. The TMDS data channels may be used for forwarding video data, audio data and auxiliary data. The HDMI system provides a Video Electronics Standards Association (VESA) Display Data Channel (DDC). The DDC is used for a configuration between a source device and a sink device and a status information exchange.

The source device 100 and the sink device 200 of the HDMI system may include the same units as the source device 100 and the sink device 200 of the DisplayPort system, and the description for the units is the same as above.

Hereinafter, various embodiments of a method for transmitting and receiving data based on the DisplayPort system will be described. However, it is understood that the following embodiments may also be identically or similarly applied to the HDMI system.

FIG. 2 is a table illustrating the resolution supported in the DisplayPort system.

Referring to FIG. 2, the DisplayPort system may support the resolutions. As shown in FIG. 2, the mandatory resolution is not designated in the DisplayPort system. Accordingly, in the DisplayPort system, the resolution of contents displayed by the sink device 200 may be changed according to the basic resolution information included in the EDID information and the parsing order or the method of the EDID information. Consequently, the problem of providing contents of low resolution may occur although the sink device 200 may support high resolution. The description for the problem will be described below in relation to FIG. 7.

FIG. 3 is a diagram illustrating an EDID structure according to an embodiment of the present invention.

Referring to FIG. 3, the EDID structure briefly shows the information included in each address.

The EDID structure is the data structure in which various types of information for the display apparatus defined in VESA are included, and may be transmitted from the sink device 200 to the source device 100, and may be read by the source device 100. In the EDID structure, the data structure of version 1.3 has been used in an IT display apparatus, a CE display apparatus and video interfaces (DisplayPort, HDMI, etc.).

The EDID structure includes a Base EDID block, and the Base EDID block also includes various types of information in relation to the sink device 200. Particularly, in relation to the present invention, the Base EDID block includes the basic resolution information that the sink device 200 is able to support. However, since the Base EDID block is in short of bit number to include the high resolution information of UHD class such as 4K and 8K, the Base EDID block includes the basic resolution information of lower resolution (e.g., HD class, Full HD class, etc.) than the high resolution. The source device 100 may determine the resolution of the video data that is going to be transmitted to the sink device 200 based on the basic resolution information of the Base EDID block.

FIGS. 4 and 5 are EDID Extension blocks according to an embodiment of the present invention. More particularly, FIG. 4 shows the EDID Extension block and FIG. 5A shows the video data block. FIG. 5B shows the audio data block and FIG. 5C shows the speaker allocation data block.

The timing information described in the Base EDID block is designed for the IT display apparatus, and the EDID 1.3 Extension block defined in Video Electronics Standards Association (VESA) may separately used in order to show the timing information of the CE display apparatus. The CEA Extension block of version 3 is defined in CEA-861B standard, and specifies four optional data blocks (video, audio, speaker allocation and vendor specific).

In the video data block shown in FIG. 5A, the Short Video Descriptor shows the Video Identification Code defined in CEA-861. In the audio data block in FIG. 5B, the Short Audio Descriptor shows the Audio Format Code defined in CEA-861. The Speaker Allocation Data Block Descriptor shown in FIG. 5C shows the Data Block Payload defined in CEA-861.

FIG. 6 shows the Display Identification Data (DisplayID) according to an embodiment of the present invention. More particularly, FIG. 6A shows the DisplayID structure and FIG. 6B shows the data block format of the DisplayID Extension block included in the DisplayID structure.

The DisplayID is a VESA standard for replacing E-EDID standard and E-EDID version 1.4. Version 1.1 of the DisplayID is published on March of 2009, and version 1.3 is published on September of 2013. The DisplayID is characterized by having various structures including the existing EDID Extension format as well as new Extension formats for the embedded display and the 3D display.

Referring to FIG. 6A, the DisplayID structure includes various data blocks related to the display of contents such as a video interface, a display device technique, timing detail and manufacturer information.

Referring to FIG. 6B, the DisplayID Extension block may include various fields. The length of each field included in the DisplayID Extension block is changeable, and particular bit number is not designated. However, the length of a specific field may be fixed.

The description for each field is as follows.
Data Block Identification field: Show the tag of each data block
Block Revision and other data: Revision increases as a bit is included or changed in each block.
Number of Payload bytes 0→248: Represent by bit number how much Payload is used in a single data block
1~Nth Data Payload Byte: Represent the role of each data Payload byte from offset 03h to Nh The DisplayID Extension block may be used as the "Video Timing Modes Data Block; hereinafter, referred to as 'video timing block') that includes the video timing mode information which is supported by the sink device 200. In this case, the video timing block may include the resolution information, the timing information, and so on which are required for playing the contents of the sink device 200. Particularly, the video timing block according to an embodiment of the present invention may include the high resolution information which is not included in the Base EDID block, for example, the information of 4K and 8K resolution of UHD class.

There are six types of the video timing block, and the source device 100 may transmit the video data based on a type of the video timing block among the six types to the sink device 200. For this process, at least one type of the video timing block among the six types may include the priority information of the video timing block. Here, the priority information of the video timing block may be the information that represents the priority of at least one video timing block or a plurality of timing blocks that the sink device 200 is able to support.

The source device 100 may determine a type of the video timing block based on the priority information, and transmit the video data based on the determined video timing block to the sink device 200. Since the video timing block is included in the DisplayID structure, in the present invention, it may be expressed that the priority information of the video timing block is included in the DisplayID structure. The embodiment of the video timing block will be described in more detail below in relation to FIG. 11.

FIG. 7 is a flowchart illustrating a method for transmitting and receiving data of a DisplayPort system.

Referring to FIG. 7, firstly, the source device 100 and the sink device 200 may be connected with each other (step, S600). In this case, the source device 100 and the sink device 200 may be connected via the DisplayPort cable, but not limited thereto, and may be connected via the HDMI cable.

Next, the source device 100 may switch a power line to a high level, and may apply a current (step, S610). For example, the source device 100 may switch the 5V power line from the low level to the high level, and apply the current. Through the process, the source device 100 may operate the EEPROM in which the EDID information is stored and the related circuitry as well.

Subsequently, the sink device 200 may switch a Hot Plug Detect (HPD) line from the low level to the high level (step, S620). In this case, the sink device 200 may notify the fact that the DisplayPort cable is normally connected, and that the EDID related circuitry is activated so that the access to the EDID information is available to the source device 100.

Next, the source device 100 may transmit an EDID information readout request to the sink device 200 (step, S630).

Subsequently, in response to the EDID information readout request, the sink device 200 may transmit the EDID information stored in the EDID EEPROM to the source device 100 (step, S640). The EDID information may include the Base EDID block, the CEA Extension block and the DisplayID structure. The description for the element is as described above in relation to FIG. 3 to FIG. 6.

Next, the source device 100 may parse the EDID information (step, S650). In this case, although it is not shown in the flowchart, the source device 100 may determine the resolution of the video data that is going to be transmitted to the sink device 200 based on the Base EDID block and/or the DisplayID structure included in the EDID information.

The DisplayID which is the capability information of the sink device corresponds to the capability information of a version which is newly added after the EDID 2.0 version. It is essential that the sink device supports the DisplayID2.x or higher.

A multi version block is not supported for the DisplayID which is the capability information of the sink device. As related functions are added to the capability information of a specific version or higher for a specific function and the use of the capability information of the specific version or higher is compelled, the source device which may read only capability information of a specific version or less has a problem in that it is impossible to read the capability information of the specific version or higher, when the capability information of the specific version or higher is transmitted from the sink device to the source device. In this regard, the capability information of the sink device of the specific version or higher may indicate the DislayID2.x.

FIG. 8 is a diagram illustrating examples of problem situations to which a method proposed in the present disclosure may be applied.

Referring to 810 of FIG. 8, the source device may read the capability information of the specific version (DislayID2.0) or higher, and the sink device may support the capability information of the specific version (DislayID2.0) or higher. In this case, since the source device is a device which may read the capability information of the specific version or higher, the source device may read the capability information, when the sink device transmits the capability information of the specific version or higher to the source device.

Referring to 820 of FIG. 8, the source device may not read the capability information of the specific version (DislayID2.0) or higher, and the sink device may support the capability information of the specific version (DislayID2.0) or higher. In this case, since the source device is a device which may not read the capability information of the specific version or higher, the source device may not read the capability information, when the sink device transmits the capability information of the specific version or higher to the source device.

Referring to 830 of FIG. 8, the source device may read the capability information of the specific version (DislayID2.0) or higher, and the sink device may support the capability information of a specific version (DislayID1.3) or less. In this case, since the source device is a device which may read the capability information of the specific version or higher and the sink device transmits the capability information of the specific version or less to the source device, the source device may naturally read the capability information transmitted by the sink device.

Referring to 840 of FIG. 8, the source device may not read the capability information of the specific version (DislayID2.0) or higher, and the sink device may support the capability information of the specific version (DislayID1.3) or less. In this case, since the source device is a device which may not read the capability information of the specific version or higher but the sink device transmits the capability information of the specific version or less to the source device, the source device may naturally read the capability information transmitted by the sink device.

FIG. 9 is a flowchart illustrating an example of an operation between the sink device and the source device to which the method proposed in the present disclosure may be applied.

S910: The sink device switches a HPD (Hot Plug Detect) line from a low level to a high level. In this case, the sink device may inform the source device that the DisplayPort cable is normally connected, and the EDID related circuitry is activated so that the access to the EDID information is available.

S920: Next, the source device transmits EDID information/DisplayID (capability information) read request to the sink device. In this regard, the source device may receive the EDID information/DisplayID as a response to the EDID information read request from the sink device. In this step, when the capability information of the specific version or higher is transmitted from the sink device to the source device, the source device which may read only the capability information of the specific version or less may have a problem in that it is impossible to read the capability information of the specific version or higher. Here, the sink device may be set to transmit, to the source device, the capability information of the sink device corresponding to a lower version of the capability information of the specific version or higher, in a Default mode. To be more specific, when the sink device may support the capability information of two versions of DisplayID1.x and DisplayID2.x, the sink device may be set to transmit the capability information of DisplayID1.x in the Default Mode to the source device.

S930/S940: Next, the source device performs a DPCD (DisplayPort Configuration Data) Read/DPCD Write operation. In step S940, during the DPCD write operation, the source device may transmit, to the sink device, the support version information indicating whether the source device may read/parse the capability information of the sink device of the specific version or higher. To be more specific, the source device may inform the sink device that the source device may read the capability information of the sink device of a higher version, based on the write of the support version information. Subsequently, if the sink device recognizes that the source device may read the capability information of the sink device of the higher version, the sink device may change an operation mode, which is set to transmit the capability information of the lower version for a legacy (source) device, so as to transmit the capability information of the higher version, thus eliminating the compatibility issue.

Through the method proposed in the present disclosure, it is possible to solve a recognition error problem due to a connection error occurring because the source device recognizing only the SC (Sink Capability (e.g. EDID, DisplayID)) of the lower version does not recognize the SC of the higher version.

The source device which may support (read) the capability information of the higher version of the sink device may include the support version information in the DPCD (DisplayPort Configuration Data) or SDP (Second Data Packet) and transmit the support version information to the sink device, so as to inform the sink device that the source device is a device (support version information) which may read the capability information of the higher version.

FIGS. 10 and 11 are diagrams illustrating an example of a method where the source device transmits support version information to the sink device.

To be more specific, FIG. 10 is a diagram illustrating an example of a method in which the source device includes the support version information in the DPCD (DisplayPort Configuration Data) to transmit it to the sink device. The support version information may be included in a DISPLAY-ID_VERSION_INFO field. The DISPLAYID_VERSION_INFO field may be formed of a 7-bit bit string, bit 0 may indicate the support version information, and bit 1:7 may be formed of a reserved bit. When the value of bit 0 is zero (0), the support version information may indicate that the source device may not read the capability information of the higher version. In contrast, when the value of bit 0 is 1, the support version information may indicate that the source device may read the capability information of the higher version.

Furthermore, FIG. 11 is a diagram illustrating an example of a method in which the source device includes the support version information in the SDP (Second Data Packet) to transmit it to the sink device. The support version information may be formed of a 7-bit bit string in the name of DISPLAYID_VERSION in the SDP, bit 0 may indicate the support version information, and bit 1:7 may be formed of the reserved bit. When the value of bit 0 is zero (0), the support version information may indicate that the source device may not read the capability information of the higher version. In contrast, when the value of bit 0 is 1, the support version information may indicate that the source device may read the capability information of the higher version.

FIG. 12 is a flowchart illustrating an example where the method proposed in the present disclosure is performed.

S1210: The sink device changes a HPD (Hot Plug Detect) line from a low level to a high level. In this case, the sink device may inform the source device that the DisplayPort cable is normally connected, and the EDID related circuitry is activated so that the access to the EDID information is available.

S1220: Next, the source device transmits EDID information/DisplayID (capability information) read request to the sink device. In this regard, the source device may receive the EDID information/DisplayID as a response to the EDID information read request from the sink device. Here, the sink device may be set to transmit, to the source device, the capability information of the sink device corresponding to a lower version of the capability information of the specific version or higher, in a Default mode. To be more specific, when the sink device may support the capability information of two versions of DisplayID1.x and DisplayID2.x, the sink device may be set to transmit the capability information of DisplayID1.x in the Default Mode to the source device.

S1230: Next, the source device performs a DPCD (DisplayPort Configuration Data) Read operation.

S1240: Subsequently, the source device performs a DPCD Write operation. In this step, during the DPCD write operation, the source device may transmit, to the sink device, the support version information indicating whether the source device may read/parse the capability information of the sink device of the specific version or higher. To be more specific, the source device may inform the sink device that the source device may read the capability information of the sink device of a higher version, based on the write of the support version information. Subsequently, if the sink device recognizes that the source device may read the capability information of the sink device of the higher version, the sink device may change an operation mode, which is set to transmit the capability information of the lower version for a legacy (source) device, so as to transmit the capability information of the higher version, and may transmit the capability information of the higher version to the source device.

FIG. 13 is a flowchart illustrating another example where the method proposed in the present disclosure is performed.

S1310: The sink device changes a HPD (Hot Plug Detect) line from a low level to a high level. In this case, the sink device may inform the source device that the DisplayPort cable is normally connected, and the EDID related circuitry is activated so that the access to the EDID information is available.

S1320: Next, the source device transmits EDID information/DisplayID (capability information) read request to the sink device. In this regard, the source device may receive the EDID information/DisplayID as a response to the EDID information read request from the sink device. Here, the sink device may be set to transmit, to the source device, the capability information of the sink device corresponding to a lower version of the capability information of the specific version or higher, in a Default mode. To be more specific, in FIG. 13, the sink device may be set to transmit the capability information of DisplayID1.x in the Default Mode to the source device. Here, the sink device may support the capability information of two versions of DisplayID1.x and DisplayID2.x.

S1330: Next, the source device performs a DPCD (DisplayPort Configuration Data) Read operation.

S1340: Subsequently, the source device performs a DPCD Write operation. In this step, during the DPCD write operation, the source device may transmit, to the sink device, the support version information indicating whether the source device may read/parse the capability information of the sink device of the specific version or higher. To be more specific, the source device may inform the sink device that the source device may read the capability information of the sink device of a higher version, based on the write of the support version information. Subsequently, if the sink device recognizes that the source device may read the capability information of the sink device of the higher version, the sink device may change an operation mode, which is set to transmit the capability information of the DisplayID1.x for a legacy (source) device, so as to transmit the capability information of the DisplayID2.x, and may transmit the capability information of the DisplayID2.x to the source device.

In addition, when the support version information indicates that the source device may read the information of a higher version than the capability information of the specific version, the support version information may further include sub-version information about a sub-version of the version of the capability information of the sink device which is readable by the source device. When the version of the capability information of the sink device is defined in the form of x.y, they represents the sub-version of the version of the capability information. Here, the x and the y are non-negative integers. As values of the x and the y are larger, the capability information of the sink device may be higher version capability information. The sub-version information may be information on the y.

FIG. 14 is a flowchart illustrating an example of a method where the source device establishes a connection with the sink device, according to the present disclosure.

First, the source device receives, from the sink device, the first capability information of the sink device related to a specific function (S1410).

Next, the source device transmits, to the sink device, the support version information on the version of the capability information of the sink device which is readable by the source device (S1420).

Finally, the source device receives, from the sink device, the second capability information of the sink device related to the specific function based on the support version information (S1430). Here, the version of the second capability information is set based on the support version information.

Further, the first capability information may be set to be transmitted using a specific version, regardless of the version of the capability information which may be supported in the sink device.

In addition, the support version information may be information on whether the source device may read the capability information of the sink deice of the higher version than the specific version of the first capability information.

Furthermore, when the support version information indicates that the source device may read the capability information of the sink device of the higher version than the specific version of the first capability information, the version of the second capability information may be set to the higher version than the specific version of the first capability information, based on the support version information.

Further, when the support version information indicates that the source device may read the capability information of the sink device of the higher version than the specific version of the first capability information, the support version information may further include sub-version information on the sub-version of the version of the capability information of the sink device which is readable by the source device.

Here, the version of the capability information of the sink device is defined in the form of x.y, and the x and they are non-negative integers. As values of the x and they are larger, the capability information of the sink device may be higher version capability information, and the y may represent the sub-version of the version of the capability information of the sink device.

Further, the value of the x of the specific version of the first capability information may be 1, and the value of x of the version of the second capability information set to a higher version than the specific version of the first capability information may be 2.

In addition, when the support version information indicates that the source device may not read the capability information of the sink device of the higher version than the specific version of the first capability information, the second capability information may not be transmitted from the sink device to the source device.

Further, the support version information may be included in DPCD (DisplayPort Configuration Data) and transmitted.

Furthermore, the support version information may be included in SDP (Second Data Packet) and transmitted.

It is apparent to those skilled in the art that the present invention can be embodied in other specific forms without departing from the essential characteristics of the present invention. Accordingly, the foregoing detailed description should not be construed as restrictive in all respects but as exemplary. The scope of the present invention should be determined by a reasonable interpretation of the appended claims, and all modifications within the equivalent scope of the present invention are included in the scope of the present invention.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product inventions and process inventions, description of both inventions may be complementarily applied as needed.

What is claimed is:

1. A method for a source device to establish a connection with a sink device, the method comprising:
   receiving, from the sink device, first capability information of the sink device related to a specific operation;
   transmitting, to the sink device, support version information on a version of capability information of the sink device readable by the source device; and
   receiving, from the sink device, second capability information of the sink device related to the specific operation based on the support version information,
   wherein a version of the second capability information is configured to (i) a same version as a version of the first capability information, or (ii) a higher version than the version of the first capability information, based on the support version information, and
   wherein the version of the first capability information is configured to be transmitted using a specific version regardless of the version of the capability information supportable by the sink device.

2. The method of claim 1,
   wherein the support version information is information on whether the source device supports the capability information of the sink device of a higher version than the specific version of the first capability information.

3. The method of claim 2,
   wherein based on the support version information including information that the source device supports the capability information of the sink device of a higher version than the specific version of the first capability information, the version of the second capability information is set to a higher version than the specific version of the first capability information based on the support version information.

4. The method of claim 3,
   wherein based on the support version information including information that the source device supports the capability information of the sink device of a higher version than the specific version of the first capability information, the support version information further includes sub- version information on a sub-version of the version of the capability information of the sink device that the source device can read,
   wherein the version of the capability information of the sink device is defined in a form of x, y,
   wherein the x and the y are non-negative integers,
   wherein as values of the x and the y are larger, the capability information of the sink device is a higher version capability information, and wherein the y indicates the sub-version of the version of the capability information of the sink device.

5. The method of claim 4,
wherein the value of the x of the specific version of the first capability information is 1, and
wherein the value of x of the version of the second capability information set to a higher version than the specific version of the first capability information is 2.

6. The method of claim 4,
wherein based on the support version information including information that the source device does not support the capability information of the sink device of a version higher than the specific version of the first capability information, the second capability information is not transmitted from the sink device to the source device.

7. The method of claim 1,
wherein the support version information is included in DPCD (DisplayPort Configuration Data) and transmitted.

8. The method of claim 1,
wherein the support version information is included in SDP(Second Data Packet)and transmitted.

9. A source device to establish a connection with a sink device, the source device comprising:
a transmitter for transmitting and receiving data,
a control unit for controlling the transmitter; and
at least one computer memory operably connectable to the control unit and storing instructions for performing operations when executed by the enemy control unit,
wherein the operations include:
receiving, from the sink device, first capability information of the sink device related to a specific operation;
transmitting, to the sink device, support version information on a version of capability information of the sink device readable by the source device; and
receiving, from the sink device, second capability information of the sink device related to the specific operation based on the support version information,
wherein a version of the second capability information is configured to (i) a same version as a version of the first capability information, or (ii) a higher version than the version of the first capability information, based on the support version information, and
wherein the version of the first capability information is configured to be transmitted using a specific version regardless of the version of the capability information supportable by the sink device.

* * * * *